(12) United States Patent
Webman et al.

(10) Patent No.: US 9,383,928 B2
(45) Date of Patent: Jul. 5, 2016

(54) REPLICATION TECHNIQUES WITH CONTENT ADDRESSABLE STORAGE

(75) Inventors: Erez Webman, Petach-Tikva (IL); Ehud Rokach, Tel-Aviv (IL); Shahar Frank, Ramat-HaSharon (IL)

(73) Assignee: EMC CORPORATION, Hopkinton, MA (US)

( * ) Notice: Subject to any disclaimer, the term of this patent is extended or adjusted under 35 U.S.C. 154(b) by 285 days.

(21) Appl. No.: 13/158,498

(22) Filed: Jun. 13, 2011

(65) Prior Publication Data

US 2012/0317353 A1      Dec. 13, 2012

(51) Int. Cl.
    *G06F 12/00*    (2006.01)
    *G06F 13/00*    (2006.01)
    *G06F 13/28*    (2006.01)
    *G06F 3/06*     (2006.01)

(52) U.S. Cl.
    CPC .............. *G06F 3/0613* (2013.01); *G06F 3/065* (2013.01); *G06F 3/0641* (2013.01); *G06F 3/0683* (2013.01)

(58) Field of Classification Search
    CPC ..... G06F 3/0613; G06F 3/0641; G06F 3/065; G06F 3/0683; G06F 17/30578; G06F 17/30581
    USPC ................................. 711/108, 162
    See application file for complete search history.

(56) References Cited

U.S. PATENT DOCUMENTS

| | | | |
|---|---|---|---|
| 5,751,719 A * | 5/1998 | Chen et al. ................ 370/473 |
| 5,787,481 A * | 7/1998 | Boutaud ............... G06F 9/3834 711/150 |
| 5,982,675 A * | 11/1999 | Fujimoto ................ 365/189.05 |
| 6,151,658 A * | 11/2000 | Magro ........................ 711/110 |
| 6,438,660 B1 * | 8/2002 | Reams ......................... 711/143 |
| 6,480,950 B1 * | 11/2002 | Lyubashevskiy et al. ..... 711/206 |
| 6,785,154 B2 * | 8/2004 | Sunaga et al. ................ 365/100 |
| 7,734,603 B1 * | 6/2010 | McManis ...................... 707/696 |
| 7,788,220 B1 | 8/2010 | Auchmoody et al. |

(Continued)

FOREIGN PATENT DOCUMENTS

| | | |
|---|---|---|
| WO | WO 2010/048531 | 4/2010 |
| WO | WO 2012/172551 | 12/2012 |
| WO | WO 2012/172553 | 12/2012 |

OTHER PUBLICATIONS

International Search Report and the Written Opinion Dated Oct. 5, 2012 From the International Searching Authority Re.: Application No. PCT/IL2012/050205.

(Continued)

*Primary Examiner* — Sheng-Jen Tsai
(74) *Attorney, Agent, or Firm* — Krishnendu Gupta, Esq.; Konrad R. Lee, Esq.

(57) ABSTRACT

A CAS data storage system with one or more source CAS data storage spaces and one or more destination CAS data storage spaces, and a communication line therebetween, receives input data at the source storage space for local storage and for replication to the destination CAS storage space. CAS metadata is used in the replication procedure between the two separate CAS storage spaces. Thus, data at the source storage space is used to form an active buffer for transfer to the destination storage space, the active buffer holding a hash result of the respective data item and a storage address. The system detects whenever there is more than one data item in said active buffer sharing a same storage address and upon such detection transfers a respective hash result of only the last of the data items.

22 Claims, 4 Drawing Sheets

(56) References Cited

U.S. PATENT DOCUMENTS

| | | | |
|---|---|---|---|
| 7,958,101 B1 | 6/2011 | Teugels et al. | |
| 8,233,392 B2* | 7/2012 | Samuels et al. | 370/235 |
| 8,281,066 B1* | 10/2012 | Trimmer et al. | 711/103 |
| 8,321,380 B1* | 11/2012 | Leverett | 707/660 |
| 8,489,686 B2* | 7/2013 | Khosravi et al. | 709/205 |
| 2002/0042796 A1* | 4/2002 | Igakura | 707/205 |
| 2006/0059496 A1* | 3/2006 | Joy et al. | 719/310 |
| 2006/0095690 A1* | 5/2006 | Craddock | G06F 12/1475 711/153 |
| 2007/0180265 A1* | 8/2007 | Hiroshi | 713/187 |
| 2007/0300249 A1* | 12/2007 | Smith et al. | 725/19 |
| 2008/0126431 A1* | 5/2008 | Walliser et al. | 707/200 |
| 2009/0013141 A1* | 1/2009 | Kinoshita | 711/163 |
| 2009/0089337 A1* | 4/2009 | Perlin et al. | 707/200 |
| 2009/0271502 A1* | 10/2009 | Xue et al. | 709/219 |
| 2009/0284779 A1* | 11/2009 | Isshiki | 358/1.13 |
| 2009/0327625 A1* | 12/2009 | Jaquette et al. | 711/160 |
| 2010/0260187 A1* | 10/2010 | Ongole et al. | 370/395.53 |
| 2011/0016503 A1* | 1/2011 | Schaefer et al. | 725/115 |
| 2011/0047154 A1* | 2/2011 | Yang et al. | 707/736 |
| 2011/0154102 A1* | 6/2011 | Akutsu et al. | 714/6.1 |
| 2011/0307659 A1* | 12/2011 | Hans et al. | 711/114 |
| 2012/0124012 A1* | 5/2012 | Provenzano et al. | 707/692 |
| 2012/0203980 A1* | 8/2012 | Flynn et al. | 711/154 |
| 2012/0317395 A1* | 12/2012 | Segev | G06F 17/30578 711/216 |
| 2013/0036289 A1* | 2/2013 | Welnicki et al. | 711/173 |

OTHER PUBLICATIONS

International Search Report and the Written Opinion Dated Oct. 8, 2012 From the International Searching Authority Re. Application No. PCT/IL2012/050203.

Notification concerning Transmittal of International Preliminary Report on Patentability mailed Jan. 3, 2014, including International Preliminary Report on Patentability and Written Opinion of the International Searching Authority dated Dec. 13, 2013, for International application No. PCT/IL2012/050203; 5 pages; Geneva, Switzerland.

\* cited by examiner

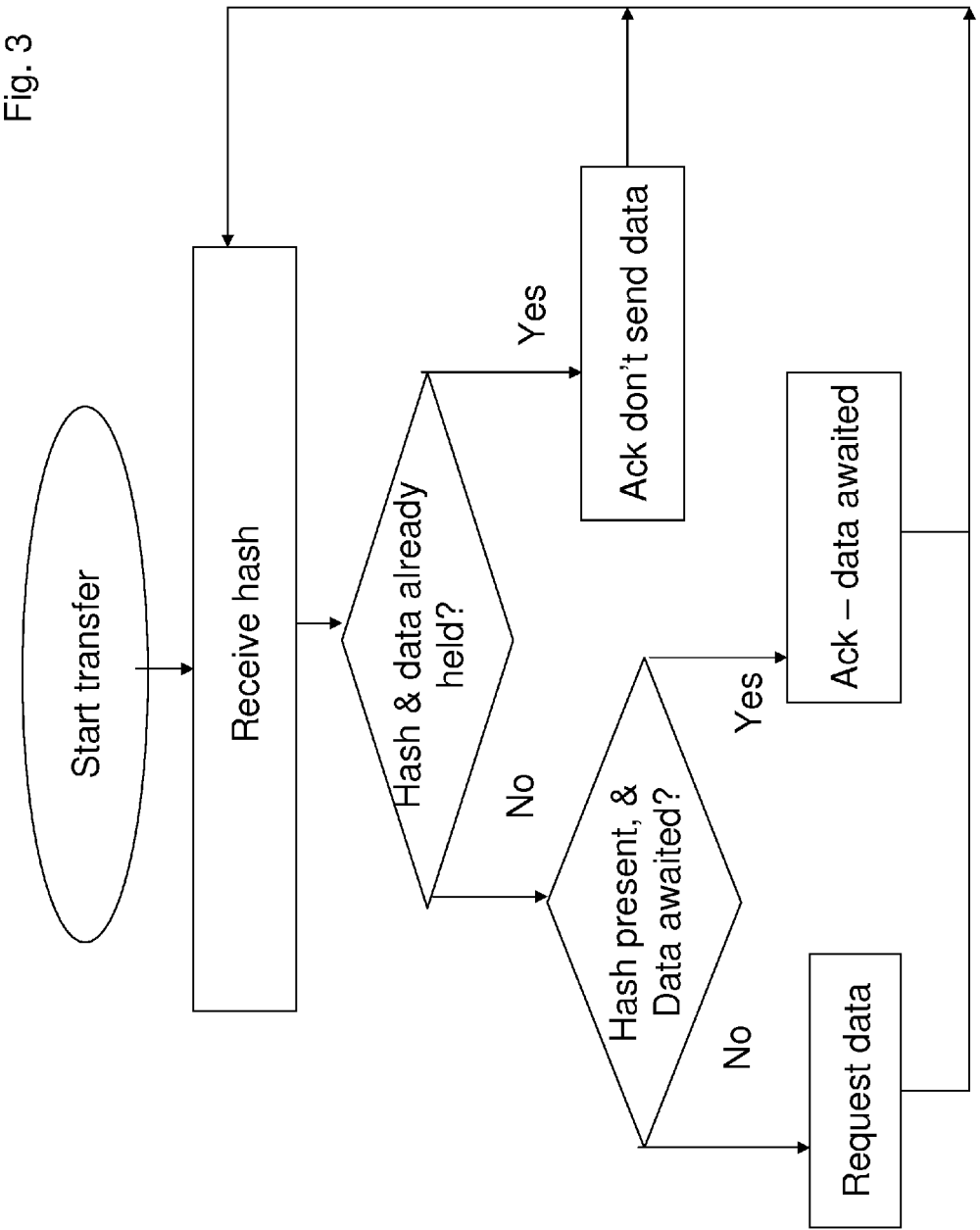

REPLICATION TECHNIQUES WITH CONTENT ADDRESSABLE STORAGE

FIELD AND BACKGROUND OF THE INVENTION

The present invention relates to a system and method for content addressable storage and, more particularly, but not exclusively to a system and method for reducing the amount of data transfer during replication in a content addressable storage system.

Content addressable storage, CAS, also referred to as associative storage, is a mechanism for storing information that can be retrieved based on the content rather than on the storage location. CAS is typically used for storage and retrieval of fixed content and for archiving or permanent storage.

In Content Addressable Storage, the system records a content address, a key that uniquely identifies the information content. A hash function is typically used as the key to identify the data content, and the quality of the system depends on the quality of the hash function. Too weak a hash function may lead to collisions between different content items.

A typical CAS storage space has access nodes through which input and output is handled and storage nodes for permanent storage of the data, and CAS metadata allows for content addressing and retrieval within the system.

Often the storage space requires to be backed up, and thus a replication of the source space is constructed at a destination location. The source and destination spaces are often not located physically together and there may be bandwidth limitations and latency involved in communication between the two. For the purpose of replication, nodes at the storage space are required to provide reliable copies of input data to the destination, and any system has to allow for failures at one location or another in a way that takes account of the latency within the system. It is furthermore desirable to avoid unnecessary data transfer in view of the limitations on bandwidth.

It is noted that the CAS storage space considered here is a system that is internally a CAS system but looks like a standard data storage block to external applications. That is to say, CAS metadata such as hashes are not generally available externally to the memory block.

SUMMARY OF THE INVENTION

The present embodiments may use the internal CAS metadata from separate CAS storage spaces to support replication processes between the storage spaces.

According to one aspect of the present invention there is provided a CAS data storage system comprising:
  at least one source CAS data storage space
  at least one destination CAS data storage space, and
  a communication line connecting said source storage space and said destination storage space, and wherein input data for storage in said system arrives at said source storage space for storage at said source storage space and to be replicated to said destination storage space, the source storage space further comprising an active buffer of incoming data for replication to said destination storage space, said active buffer configured to hold for each of a plurality of data items of said incoming data, a hash result of the respective data item and an address, the system being configured to detect whenever there is more than one data item in said active buffer sharing a same address and upon such detection to transfer a respective hash result of only a last of said data items sharing said same address, to said destination storage space.

In an embodiment, said source storage space is configured to transfer said active buffer when said active buffer is complete, and said destination storage space is configured to test hash results contained in said transferred active buffer to determine whether any or all of said hash results are already present at said destination, corresponding data being requested from said source storage space only in the case of a hash result not already present at said destination storage space.

In an embodiment, said destination storage space may be configured to send a signal indicating whether said transfer of said corresponding data is needed, said destination storage space being further configured such that upon receipt of a hash key identical to an earlier hash key for which data transfer was required but for which said data transfer is currently incomplete, a modified acknowledge signal is issued indicating that data is awaited.

In an embodiment, a time-out is set following said earlier hash key, such that said modified signal indicating that said data is awaited is only sent prior to expiry of said timeout.

In an embodiment, said source storage space comprises a plurality of nodes each with a separate active buffer, the system being configured to complete respective active buffers simultaneously at all of said plurality of nodes and to toggle to new respective active buffers.

In an embodiment, said source storage space is configured to select one of said nodes as a master node to monitor said respective active buffers and to carry out said simultaneous completion and toggling.

In an embodiment, data items at said destination storage space are stored as data content alongside hash keys identifying said data content, said data items being de-referenced on deletion, said system being configured to reuse said de-referenced data items by comparing deleted hash keys to hash keys of incoming data items.

According to a second aspect of the present invention there is provided a CAS data storage system comprising at least one source CAS data storage space and a destination CAS data storage space, and a communication line connecting said source storage space and said destination storage space, and wherein input data for storage in said system arrives at said source storage space for storage in said source storage space and replication in said destination storage space, and wherein a hash key of a data item is transferred to said destination storage space, the hash key enabling the destination storage space to determine whether said data corresponding to the data item is already present at said destination storage device and does not require data transfer, said destination storage space being configured to send a signal indicating whether data transfer is required.

In an embodiment, the destination storage space may be further configured such that upon receipt of a hash key identical to an earlier hash key for which data transfer was required but for which said data transfer is currently incomplete a modified acknowledge signal is issued indicating that data is awaited.

An embodiment may be configured to carry out initial synchronization by sending hash keys of successively stored data items of said source storage space.

In an embodiment, a time-out is set following said earlier hash key, such that said modified signal indicating receipt of an identical hash key is only sent prior to expiry of said timeout.

According to a third aspect of the present invention there is provided a system comprising two CAS data storage spaces with synchronous replication therebetween, one of said storage spaces being a source CAS data storage space and another of said storage spaces being a destination CAS data storage space, the system further comprising a communication line connecting said source storage space and said destination storage space and having a latency, communication over said communication line comprising sending data and acknowledgements in a synchronous cycle, wherein input data for storage in said system arrives at said source storage space for storage in said source storage space and replication to said destination storage space, and wherein a hash key of a data item is transferred to said destination storage space followed within said cycle by starting to transfer corresponding data without awaiting a corresponding acknowledgement, the hash key enabling the destination storage space to determine whether said corresponding data is already present at said destination storage device and does not require data transfer, and to send an acknowledgement in said respective synchronous cycle indicating whether said data transfer is required, said acknowledgement usable at said source storage space to carry out one member of the group comprising discontinuing said started transfer of said corresponding data and acknowledging to a sending application.

According to a fourth aspect of the present invention there is provided a CAS data storage system in which data items are stored as data content alongside hash keys identifying said data content, said data items being de-referenced on deletion, said system being configured to reuse said de-referenced data items by reading said hash keys.

According to a fifth aspect of the present invention there is provided a CAS data storage method wherein input data arrives at a source CAS data storage space for storage at said source storage space and replication to a destination CAS data storage space over a communication line, the method comprising filling an active buffer, at said source storage space, with incoming data for transfer to said destination storage space, said active buffer holding for each of a plurality of data items of said incoming data, a hash result of the respective data item and a storage address, the method further comprising detecting whenever there is more than one data item in said active buffer sharing a same storage address and upon such detection transferring to said replication storage space a respective hash result of only a last of said data items sharing said same storage address.

An embodiment may comprise:
transferring said active buffer from said source storage space to said destination storage space when said active buffer is complete,
at said destination storage space testing hash results contained in said transferred active buffer to determine whether any or all of said hash results are already present at said destination, and
requesting corresponding data from said source storage space only in the case of a hash result not already present at said destination storage space.

An embodiment may comprise:
sending a signal from said destination storage space, indicating whether transfer of said corresponding data is required, and
upon receipt of a hash key identical to an earlier hash key for which data transfer was requested but for which said data transfer is currently incomplete a modified acknowledge signal is issued indicating that the corresponding data is awaited and should not be sent.

In an embodiment, a time-out is set following said earlier hash key, such that said modified signal indicating that the data is awaited is only sent prior to expiry of said timeout.

In an embodiment, said source storage space comprises a plurality of nodes each with a separate active buffer, the method further comprising:
completing respective active buffers simultaneously at all of said plurality of nodes; and
toggling at each of said plurality of nodes to new respective active buffers.

In an embodiment, data items at said destination storage space are stored as data content alongside hash keys identifying said data content, said data items being de-referenced on deletion, the method comprising reusing said de-referenced data items by comparing deleted hash keys to hash keys of incoming data items.

According to a sixth aspect of the present invention there is provided a CAS data storage method for at least one source CAS data storage space and a destination CAS data storage space, and a communication line connecting said source storage space and said destination storage space, and wherein input data for storage in said system arrives at said source storage space for storage in said destination storage space, the method comprising:
transferring a hash key of a data item to said destination storage space, the hash key enabling the destination storage space to determine whether data corresponding to the data item is already present at said destination storage device and thus does not require data transfer, and sending a signal indicating whether said destination storage space requires data transfer.

The method may comprise, upon receipt of a hash key identical to an earlier hash key for which data transfer was required but for which said data transfer is currently incomplete, sending a modified acknowledge signal indicating that data is awaited.

The method may comprise setting a time out following receipt of said earlier hash key, such that sending said modified signal indicating that data is awaited is only sent prior to expiry of said time out.

According to a seventh aspect of the present invention there is provided a synchronized CAS data storage method for at least one source CAS data storage space and a destination CAS data storage space, and a communication line connecting said source storage space and said destination storage space and having a latency, communication over said communication line comprising sending data and acknowledgements in synchronous cycles, the method comprising: receiving input data at said source storage space for storage in said destination storage space; transferring a hash key of a data item of said input data to said destination storage space in one of said synchronous cycles;
within said one synchronous cycle starting to transfer corresponding data without awaiting a corresponding acknowledgement, the hash key enabling the destination storage space to determine whether it already has said corresponding data and does not require data transfer;
sending an acknowledgement in said respective synchronous cycle indicating whether said data transfer is required, and
one member of the group consisting of: discontinuing said started transfer of said corresponding data if said data transfer is not required, and sending an external acknowledgement to a source application.

According to an eighth aspect of the present invention there is provided a CAS data storage method in which data items are stored as data content alongside hash keys identifying said data content, said data items being de-referenced on deletion, the method comprising reusing said de-referenced data items by comparing hash keys corresponding to said de-referenced data to hash keys of incoming data items.

According to a ninth aspect of the present invention there is provided a first CAS storage space configured to generate and use CAS metadata for storing data items internally therein, and a second CAS storage space configured to generate and use CAS metadata for storing data items internally therein, the first CAS storage space being connected via a communication line to said second CAS storage space and configured to communicate metadata of said first CAS storage space to said second CAS storage space over said communication link in a replication procedure to replicate said first CAS storage space at said second CAS storage space, said CAS metadata comprising a hash key of a data item, the hash key corresponding to a data item to be transferred and enabling the destination storage space to determine whether data corresponding to the data item is already present at said destination storage device and thereby not requiring data transfer, said destination storage space being configured to send a signal indicating whether data transfer is required for said replication.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3 is a simplified flow chart illustrating the use of the data awaited case when a hash is now received which is identical to a previous hash, according to an embodiment of the present invention.

DESCRIPTION OF THE PREFERRED EMBODIMENTS

Figure 1A:
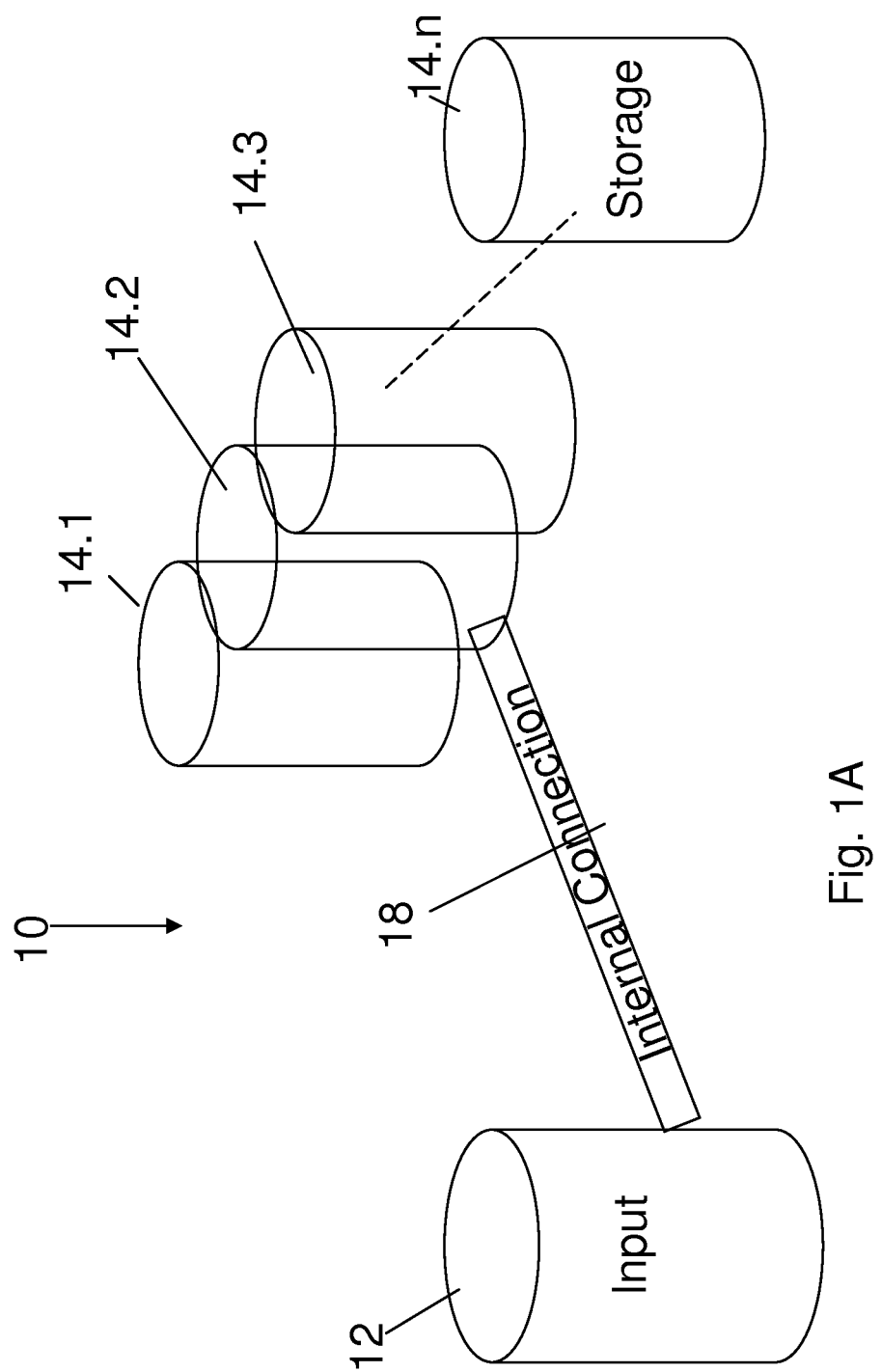
FIG. 1A is a simplified diagram illustrating possible layout of a single CAS data storage system that uses CAS metadata for internal storage and may be replicated according to the present embodiments.

In the following the term "system" is used to refer to two separate memory storage blocks or memory storage systems that are entirely separate from each other except that one is used to replicate another via a communication link which has limited bandwidth.

In the present embodiments, the source and destination storage spaces are both CAS-based in that they use CAS metadata for internal storage, but appear as standard storage blocks for external systems. The present embodiments use the internal CAS metadata from the storage spaces to support the replication process between the storage spaces.

The present embodiments comprise a system and method in which data replication from a source storage space to a destination storage space is carried out by filling an active buffer until it is complete and then transferring the buffer. The buffer is filled, not with the data itself but with a hash key of the data and an address. If the hash indicates data that is already present at the destination then the data itself need not be transferred as it is sufficient merely to store a pointer. Thus data transfer between the source and the destination is initially carried out by hash transfer.

In some embodiments, if the active buffer contains successive writes to the same address then only the last of the writes is actually transferred. This is a process referred to hereinbelow as write folding.

In a further embodiment, if the hash transferred is identical to another hash recently received and for which data transfer was requested, then the source is sent a message indicating that the corresponding data has been requested. Thus an unnecessary double transfer of the same data is avoided.

Now in data storage systems, deleted data is usually not physically deleted until it is overwritten, but is simply de-referenced. In the present embodiments, hash keys of de-referenced data may continue to be read so that deleted data is reused, again to save on redundant data transfers.

It is noted that an initial replication may involve making a static copy of all the data at the source, reading each address once. Such a copy does not require a buffer and write folding, since each address is visited exactly once. The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1A which illustrates a content addressable storage (CAS) system 10 having an input 12 and one or more internal destinations 14.1 . . . 14.n making for data storage. CAS metadata is used to organize data storage within the system, the CAS metadata being hashes and addresses, as referred to above.

Figure 1B:
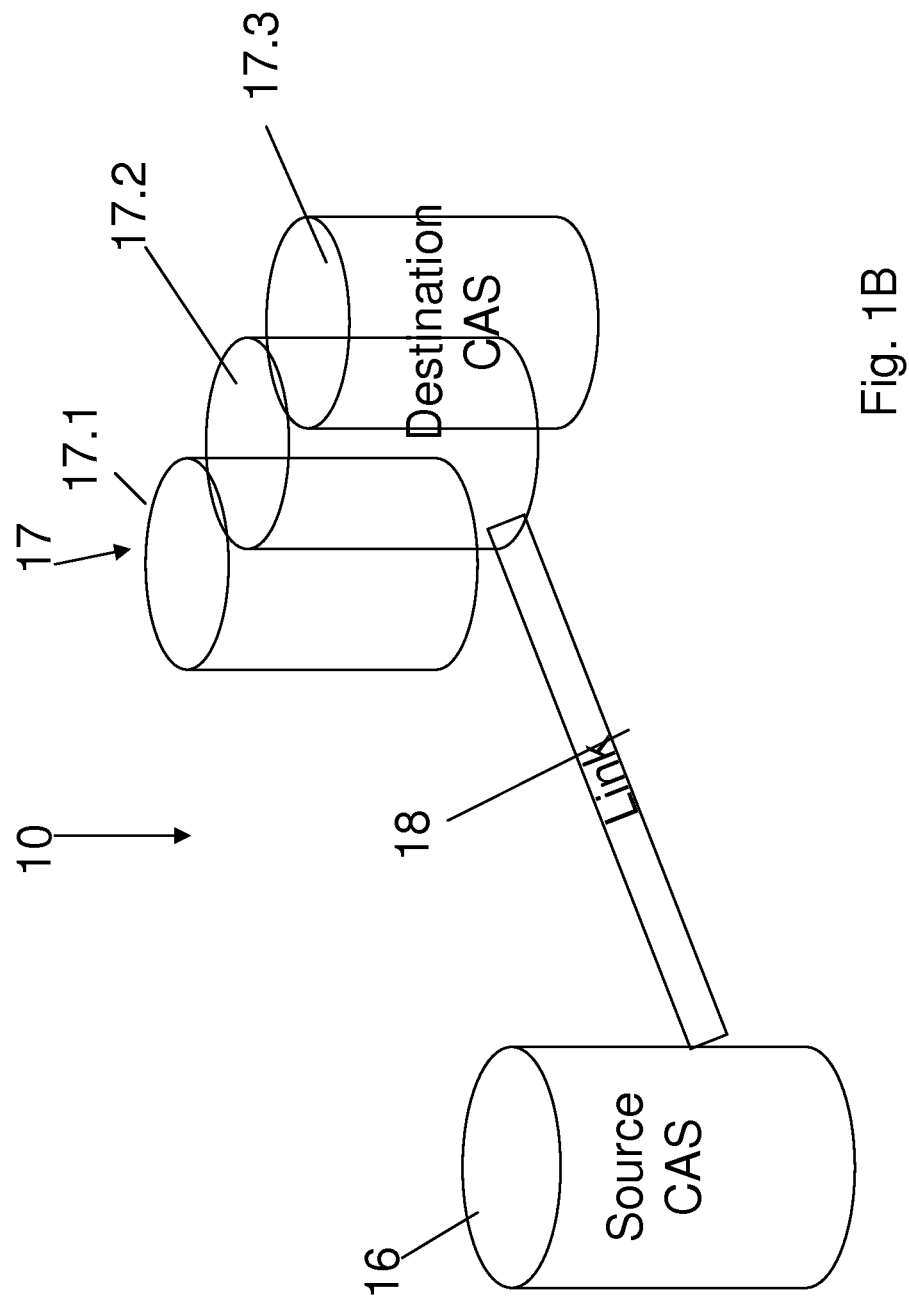
FIG. 1B is a simplified diagram showing a source storage space and several destination storage spaces on which the source storage space is replicated.

Reference is now made to FIG. 1B, which illustrates a source storage space 16 and destination storage spaces 17. The source and destination storage spaces are CAS storage systems as per FIG. 1A and generate CAS metadata for internal storage of the data, although the CAS metadata is not necessarily available externally. The destination storage spaces are intended to replicate the source storage space to provide failure backup or copying of data in general, etc A communication line 18 connects the source and destination storage spaces. The communication link may be over a large distance, perhaps many kilometers, and may have limited bandwidth and considerable latency. Input data for storage in the system arrives at the source storage space 16 and is subsequently stored therein and also replicated to the destination storage space 17. The same applies to replication of data already present in the source storage space.

Typically, data items for transfer are provided with hashes and the hashes are placed in an active buffer at the source storage space for transfer, as well as being written to the addresses. When the buffer is full, all the hashes in the buffer are transferred to the destination storage space 17. Then the destination storage space checks the hashes. Wherever data corresponding to the hashes is already present in the destination then the full data is not transmitted. Rather a pointer is stored to the full data. Only if there is no data corresponding to the hash at the destination is the source requested to transmit the full data.

Figure 2:
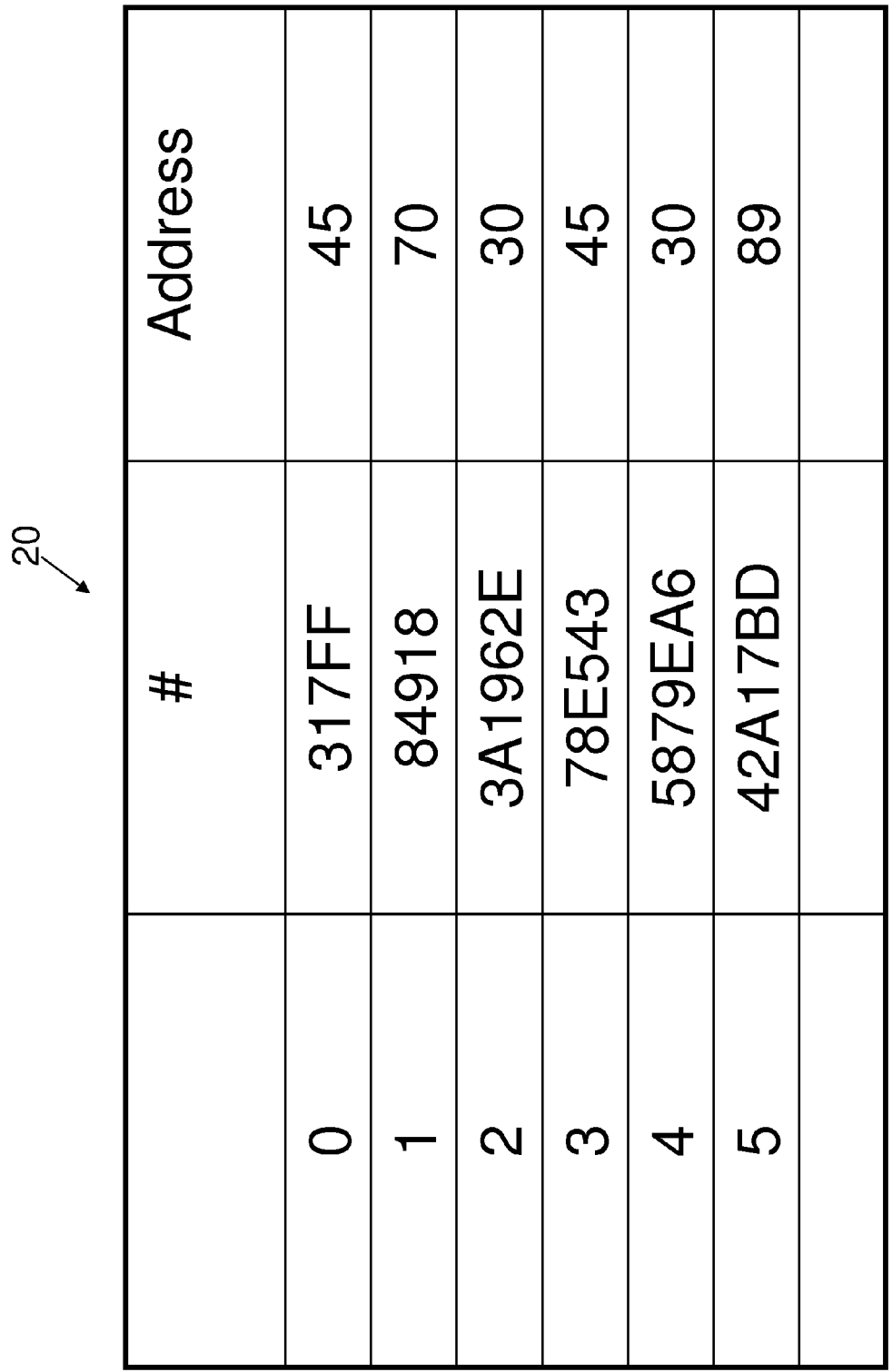
FIG. 2 is a conceptual diagram illustrating an active buffer for use in the device of FIG. 1 for which write folding according to the present embodiments is applicable.

Reference is now made to FIG. 2, which illustrates a typical active buffer 20. Six data items 0 . . . 5 are represented by hash values and have address indicators. Now, the system at the source checks whether there are more than one data item in the buffer addressed to the same location. In the case illustrated, items 0 and 3 are both destined for the same address 45. Likewise items 2 and 4 are directed to address 30. If there are then bandwidth can be saved by sending only the last of the data items for the same address to the destination, since anything earlier would be overwritten anyway. This process is known hereinbelow as write folding.

In the case illustrated item 0 can be dispensed with as it is destined to be overwritten by item 2. Likewise item 2 can be dispensed with as it is destined to be overwritten by item 4. Thus, following write folding, only items 1, 3, 4 and 5 are actually transmitted.

Reference is now made to FIG. 3, which illustrates a procedure for saving unnecessary data transfer according to an embodiment of the present invention. In FIG. 3 the destination storage space 17 receives a hash. As explained above, the destination storage space checks whether it has data corresponding to the hash. If it does then no data transfer is needed, and a simple acknowledgement is issued to the source, without a request for data transfer. If the hash and data are not present then it may be that the hash is present, but has only recently been transferred, so that the data itself is still awaited. In such a case a modified acknowledgement—data awaited— is sent, which tells the source to check again a certain amount of time later. By this time, awaited data will have arrived and so a redundant data transfer can be avoided. If neither the hash nor the corresponding data are present then a full data transfer is requested.

Typically a time-out is set for awaited data, so that the system does not wait indefinitely for data that has somehow got lost in the system. The modified acknowledgement, indicating earlier receipt of the hash key is only sent prior to expiry of the timeout.

In synchronous data replication the hash of the data item and the corresponding acknowledgement are sent in corresponding cycles.

As a first alternative, the data could be sent directly, without sending the hash at all, thus saving latency but giving up on the possibility of saving unnecessary writes.

In a second alternative, the hash may be sent and the corresponding acknowledgement sent in the following cycle. If the communication line is long and has high latency then time can nevertheless be saved by starting the data transfer before the acknowledgement arrives. Then if the acknowledgement indicates that the data transfer is not required, the transfer can be abandoned at that point.

In general, data storage frees up space by de-referencing data. Data is not physically deleted and only physically disappears when it is overwritten. In CAS storage, data is stored with its hash key to enable content addressing. In an embodiment data is deleted as usual by de-referencing but the hashes remain and the data continues to be accessed via the hashes until physically overwritten. Such an arrangement is useful for example when data is resynchronized or otherwise reorganized, as will be discussed in greater detail below.

The present embodiments are now discussed in greater detail.

The term "storage system" refers to any memory arrangement that is seen as a memory storage by an external application and includes systems that have principle storage and back up storage or systems where a source memory is replicated at a destination. None, one or more of the components of the system may include computers or processor farms or multiple disk arrangements or the like.

The term Storage Space denotes an abstraction of a persistent memory, with a well-defined address-space organization, in the context of well-defined Read and Write I/O operations and possibly some more types of I/O operations.

A (Fixed) Block Storage Space is a storage space organized as a set of fixed-size blocks, where each such block has its own unique address within the block storage space's address-space. For example, a standard SCSI storage subsystem can be viewed as providing a block storage space, where each block has a size of 512 bytes, and the storage space is organized as a set of "logical disks" (called Logical Unit in SCSI terms), where each logical unit comprises of an array of N blocks (where N*512 is the "size" of the logical unit). In this example, an address in the storage space can be formulated as [LU, LBA], where LU is the identifier of a logical unit, and LBA is the block address within that logical unit.

Note that in the real-world there exist storage spaces that are not (fixed) block storage spaces. Some examples are storage space exposed by the ESCON protocol, storage spaces that are exposed as file-systems (accessible by file-system semantics), object-disk, etc.

From this point, (fixed) block storage space is assumed. However, the concepts are equally applicable to other types of storage spaces.

The term "Applications" relates to the software entities that interact with the storage server by originating read and write I/Os to the storage space.

A Storage Space Server (hereafter abbreviated as Storage Server) is the logical entity/software that exposes a storage space to its clients by responding to the various I/O commands, including but not limited to read and write I/O commands).

Note that the definition of storage server is abstract—it may physically consist of multiple distributed hardware/software entities, it can be a storage subsystem which is located outside of the application hosts, but it can also be located higher in the data center stack, for example as software running in a host such as a volume manager, software running inside a virtualization hypervisor, a box or set of hardware boxes planted inside the SAN etc.

It is assumed hereinbelow for exemplary purposes that the storage space server is a sort of a storage subsystem located outside of the applications' hosts, and is accessible by the applications via some sort of an interconnect (e.g., FC SAN, iSCSI network etc.). However, the present embodiments relate also to storage servers that are located higher in the data center stack.

The Storage Interconnect is the set of hardware/software components connecting the applications to the storage server.

A Write Command can be viewed as a remote procedure call (RPC) between the application and the storage server. This command allows the application to set contents of one or more blocks of the storage space. Typical read/write semantics of block storage space allow a single write command to affect 1 or more blocks whose addresses are consecutive (e.g., in the SCSI standard a single write command cannot affect multiple blocks which are not consecutive). Such a range of addresses is often called an Extent.

The write is originated by the application that specifies the block addresses to be modified, and their new contents. The command is propagated via the storage interconnect and then processed by the storage server. Once processing completes, the storage server sends a Write Completion reply to the application (propagated via the storage interconnect). The write completion reply contains information that confirms whether the write was completed successfully or not.

A Read Command can be viewed as an RPC between the application and the storage server, allowing the application to read the contents of 1 or more blocks from the storage space. The flow is similar to the write command's one (except that in the read case, the data is sent from the storage server to the application).

If an application sends an I/O command (read or write) C2 after it sent C1 but before C1's reply was received, the application cannot make any assumptions regarding the order of execution between C1 and C2.

If a write fails (from various reasons, such as power failure to any of the components involved in the write I/O flow etc.) the content of the pertinent storage space blocks is generally undefined. Note that in some real-world cases (e.g., SCSI protocol), it is granted that the contents of the corresponding blocks is any combination of "old" and "new" data, where for each block, its content is either "all new" or "all old". In some cases, the storage server even grants that all the blocks associated with the failed write may either contain the entire new data or the entire old data.

For their correct restart recovery, applications trust the storage space not to lose any write it acknowledged. With this assumption in mind, an application can implement an algorithm, based on write-dependencies, that allows it to correctly recover upon an unexpected restart.

As discussed later in this document, one of the fundamental challenges for asynchronous replication is to provide, upon recovery, a destination storage space that preserves write ordering in a way that allows applications to recover correctly.

The term Replication, in the storage world vocabulary, typically refers to a set of products and/or processes that deal with copying data from a Source storage space to a Destination storage space, typically via some sort of a communication line. Since the term is somewhat ambiguous, it is worth mentioning that processes such as snapshot that can be viewed as a virtual copy or a zero time copy are not considered as replication, as the data is not truly copied.

Replication products are built to operate on source and destination storage spaces that are managed by separate storage servers that are not necessarily located near each other. While some of those products can also be used for an in-box copy (i.e., replication from a portion of a storage space to another portion of the storage space within the same storage server, etc.), the focus of replication products and of the present embodiments is on cross box replication.

It is useful to distinguish among several replication types:
Static copy
Asynchronous replication
Synchronous replication The next sections elaborate on each of the replication types.

Static Copy

The source and destination storage servers are requested to copy a portion of the source storage space to a corresponding area in the destination storage space. It is granted that during the copy, applications will not write at the source portion but only copy to the destination portion. Unlike the other types of replication, this case has a clear end point—the moment all the source data is copied to the destination.

Static copy is simpler to implement than asynchronous/synchronous replication. In the real-world, static copy is sometimes achieved by using the more capable asynchronous replication products, as they can also operate on source storage that is not modified. In other cases, static copy is achieved by special products or features of the storage server that only deal with static copy. Generally, such a products algorithm is very simple: the source storage server reads the source storage space portion that needs to be replicated, in that order or another, in that parallelism level or another, and sends the data to the destination storage server (in that order or another) via communication lines. The destination storage server eventually writes the data to the corresponding destination storage space addresses.

Asynchronous Replication

The (source and destination) storage servers are requested to continuously replicate data from a portion of the source storage space to a corresponding area in the destination storage space. During the replication, applications may write to the source storage, and eventually those changes need to be reflected on the destination storage space. Such an application write may complete (i.e., be acknowledged by the source storage server) even before that write content has been replicated to the destination storage space (hence the term "asynchronous"). Generally, it is granted that the destination storage space portion is not modified by anyone but the replication activity itself.

While there are several different use-cases in which asynchronous replication is used, they all have one thing in common—under some circumstances/conditions, one would like to use the content of the destination storage space. Such a usage typically implies that an instance of the application loads, typically on a different host, using the destination storage image as its data. In some cases, it is desired that the usage of the replicated data will not disrupt the replication. A common technique is to snapshot the destination storage space portion and let the application use the snapshot instead of the true destination storage space portion.

The different use-cases have further requirements on the asynchronous replication. Following are a few, representative, use-cases: Asynchronous replication for DR and asynchronous replication for data migration.

Asynchronous Replication for DR (Disaster Recovery)

The Need for Disaster Recovery

In the real-world enterprise-level data center, storage servers and the rest of the data center components are typically built to tolerate failures, using the well-known "protected against single-point-of-failure" concept. There are, however, conditions where multiple failures occur, resulting in the inability of the storage servers (and/or other data-center components) to function. The problematic implication are (possibly lengthy) service unavailability, and in even worse scenarios, perpetual data loss or data corruption. Following are some examples for such multi-point-of-failure conditions:

Geographical disaster: The entire site experiences a disaster (e.g., earthquake, tenor attack etc.). This may result in perpetual data loss.

Power outage: the site is experiencing a lengthy power outage. While data is probably not lost, the implication may be lengthy service unavailability.

Serious system hardware failure: a storage server experiences a serious hardware failure that unfortunately cannot be tolerated by the system fault tolerance.

Software failure (bug): A serious software failure caused a storage server to stop functioning for a lengthy period.

The term Disaster Recovery (DR) is used to describe means of sustaining extreme failures such as the ones described above. Asynchronous replication is often used for enabling disaster recovery. In most cases, the destination storage resides outside of the source site, and in many cases, it is located in long distance from the source (e.g., 1,000 miles), to be able to sustain wide-radius geographical disasters.

As described hereinbelow, synchronous replication is not practical for long distance replication and is typically very expensive for shorter-distance protection. Therefore, asynchronous replication is chosen in many cases, despite its inherent disadvantage: upon a disaster, the destination storage is not necessarily up-to-date.

Basic Expectation: Crash Consistent Image without Consulting the Source Side

The main game rule for DR asynchronous replication is the following: the replication system should be able to perform surprise recovery on the destination side, without using any data, software, or hardware components that are located on the source side (hereafter the Source Domain). Note that the source domain at least contains the source storage server (and the source storage space), but typically contains also the source hosts, interconnect, etc.

As the replication is asynchronous, the recovered destination image is inherently not up-to-date. However, to ensure correct application recovery, the destination image reflects a past image of the source storage space. As described hereinbelow, the recovered destination image preserves order of dependant writes. Such an image is called a Crash-Consistent Image as this could have been a source-side image resulting from a crash of the source-side application. Generally, enterprise-level asynchronous replication typically trusts the application ability to restart from a crash-consistent image, as this is the basic quality for the destination images.

So we can formulate the game rule for DR asynchronous replication: Upon explicit demand, the replication system should always be able to bring the destination image to a (past) crash consistent image, based only on the information persistently stored in the destination domain.

RPO

The term RPO (Recovery Point Objective) is used in the industry to describe the delta between the time of the disaster and the time of the recovered crash image. For example, if the disaster happened at 16:00:00 and the recovered destination image represents the data that was on the source storage at 15:57:00, the RPO is 3 minutes.

Note that the term RPO is not to be confused with RTO (Recovery Time Objective) which describes something different—how much time it takes to recover—so if you recovered at 16:10:00, the RPO is still 3 minutes, and the RTO is 10 minutes.

Generally, the lower the RPO the better it is for the business, as the business data loss is smaller. However, maintaining very low RPO is in many cases expensive and also possibly challenging technology-wise.

To maintain a low RPO, one should have an available replication network bandwidth which is closer and closer to the peak write bandwidth at the source storage. If higher RPO is satisfactory, the replication network bandwidth can be relaxed towards the average write bandwidth at the source storage.

There are replication techniques that achieve "best-effort" RPO—i.e., they push the write (almost) as soon as they can to the destination site, so during periods of the day where the replication network is wide enough to transfer the current writes, the RPO is very low. During other periods in the day, when write peaks occur, the RPO might get larger, or significantly larger.

There are other replication techniques that intentionally delay data on the source side—even if the replication network is not fully utilized. Sometimes, this happens due to inherent limitations of the replication technique (see discussion later). Sometimes, however, the delay is intentional, as it may increase write-folding. Write-Folding is discussed hereinbelow.

Phases of DR Asynchronous Replication

Once a replication relationship is started, the replication needs to enter a phase of initial synchronization. During this phase, the actual content of the source storage need to be copied to the destination storage. This baseline copy is essential, and before it completes, recovery upon disaster is not possible as not all data resides in the destination storage. This phase can be quite lengthy—in real-life, it can take anything between minutes and days. Furthermore, as the source storage is a moving target, meaning it gets modified during the time of the replication, writes at the source storage need to be taken into consideration by the initial synchronization algorithm. Once initial synchronization completes, the replication relationship moves to its normal, on-going mode, where new writes are replicated to the destination site. The replication needs then to be able to deal with various errors and/or resource overloading. For example, if it queues writes that have not yet been sent to the destination site, it needs to deal with cases where the write queue overflows. The repertoire of behaviors depends on the specific replication style. However, it is often the case where a concept of re-synchronization or partial re-synchronization is used to handle various resource overflows. For example, some replication products handle write-queue overflow/loss by re-synchronizing dirty areas of the source storage, using algorithms or mechanisms that are similar to the initial synchronization mechanism.

Once a disaster happens and work is switched to the destination site, there is often a need to reverse the replication back to the source site—once the source site becomes operational again. There are various sub-scenarios here, for example one that did not destroy the data on the source site (e.g., power outage). So we may reverse the replication, with the intention of failing-back to the original source site. However it is desired not to perform full initial synchronization of all the data, as the original source site still contains much of the relevant data.

Asynchronous Replication for Data-Migration

There are cases where an application is running using a source storage space, and it is desired to migrate the application's storage space to a destination storage server. In some of these cases, the destination storage server is located on a remote site. In those cases, it is also desired to migrate the application itself from a host located in the source site to a host located in the destination site. It is desired to have the whole data-migration process as transparent as possible, with minimum service disruptions.

Data-migration use-cases differ from DR use-cases in at least two aspects:
1. It is often not required to support surprise (disaster) recovery. In other words, in many cases it is legitimate to allow the source site components to be available once operation is moved to the destination site.
2. While most of the replication is done asynchronously (as opposed to "synchronously"—to have minimum performance hit on the source-site applications during the data migration), once operation is failed-over to the destination site, it is expected to have an RPO=0 recovery, as no one wants data to be lost. Since no disaster has happened, this desire is both legitimate and feasible.

While the above two differences seem quite substantial, data-migration and DR are often realized using the very same replication product and technology.

Once a data-migration replication relationship is established, the replication gets to the initial synchronization phase—which is identical to one described in the DR context. In the DR use-case, the initial synchronization is merely an introductory phase. In data-migration, the initial synchronization is almost the entire story.

Once initial synchronization completes, it is often possible to instantly switchover to the destination site. However, in many cases, there are logistical aspects that do not allow that instant switchover. In other words, in real-life, it is often the case that once initial synchronization completes, the replication needs to move to the normal, on-going mode phase for a while. That mode is identical to the one described in the DR context.

Then, the user initiates a switchover. Here we introduce a new building-block as follows: In one way or another, one needs to switch over with RPO=0. Typically, one needs to have the destination storage get closer-and-closer, RPO-wise, to the source storage. Then, the source-site application stops its activity (small disruption), so no further source storage writes take place. Then, the small delta of writes is replicated to the destination and RPO=0 can take place.

The last paragraphs explain how the same asynchronous replication engine can typically be used to achieve both DR and data-migration use-cases, although there are some basic differences between the two. Note that there are data-migration products available that cannot be used for DR, as DR does require the capability of surprise-recovery. Typically, DR-capable products can be used for data-migration, though.

Synchronous Replication (DR)

The difference between synchronous and asynchronous replications is that in synchronous replication, the application write at the source storage will be acknowledged only after it has both been written to the source storage and replicated (and persistently stored) at the destination storage.

Synchronous replication, especially if the destination does not reside in the same site as the source storage, is typically expensive as the replication communication line should provide wide enough bandwidth not to slow down the applications writing to the source storage. In addition, the latency of the replication line is critical for the source applications' performance. Due to speed of light limitations, the distance of synchronous replication is practically limited to max 100-200 km as the latency becomes unbearable. Therefore, true long distance replication must be asynchronous.

As with asynchronous replication, an initial synchronization phase is required. As in asynchronous replication, re-synchronization is required under some circumstances.

Data Reduction Techniques

For remote replication scenarios, one of the most expensive elements, and in many cases, the most expensive element, is the cost of the replication network bandwidth. In synchronous replication, the replication network bandwidth is typically the bottleneck of the entire operation, and has a direct impact upon the source site applications. In asynchronous replication, the replication network bandwidth has two basic implications:
1. Given a source storage write workload, there is a minimum replication network bandwidth X where slower networks would not allow the replication to catch-up at all, or make the entire replication extremely sensitive to unexpected peaks (even small ones) or to unexpected network availability. In other words, any slower replication network would be considered as not practical.
2. Any network faster than X will improve/allow-to-improve the overall ongoing RPO.

The term Data Reduction, in the context of replication, describes a family of techniques aiming at reducing the amount of data that needs to flow via the replication network. Being able to reduce the data can lead to dramatic cost-reduction and/or to dramatic improvement in overall RPO.

The following subsections describe the more common data-reduction techniques used in currently available asynchronous replication products:

(Wire) Compression

The data to be sent is compressed at the source side and decompressed at the receiving destination side. In real-life, this compression is realized either by the replication software itself or by dedicated network boxes located at the source and destination sites. Especially when realized by the replication software, this may become CPU intensive, which could cause a performance problem in high-bandwidth constellations. In most practical cases, the effectiveness of compression is limited, and yet, it is a very useful technique, which is complementary to the other data reduction techniques.

Wire Dedupe

Typically realized by dedicated network boxes located at the source and destination sites, the boxes maintain a dictionary of keys that represent data messages that were transferred via those boxes. Once a new message is sent, the source-side box checks whether the message already exists in the dictionary. If yes, then the key is submitted instead of the data. The key is significantly shorter than the data hence in those cases the data saving can be significant. Superficially put, since the dictionary is limited in size, the effectiveness of the technique is limited, especially if the time window of identical messages is larger than the time window of the dictionary. Furthermore, there are many cases where the contents of the about-to-be-replicated data blocks reside in the destination storage space, and yet, have not been recently transmitted. In those cases, the wire dedupe is not capable of reducing the data.

Write-Folding

Consider the following scenario (writes are at an asynchronously replicated source storage space):

(W0) At t0, the application wrote "A" to address 100
(W1) At t1, "B" to address 120
(W2) At t2, "C" to address 130
(W3) At t3, "D" to address 100 (overwriting the previous "A")

Suppose writes W0 . . . W3 have not yet been sent to the destination storage space (e.g., queued by the asynchronous replication system). Since W0 and W3 wrote to the very same address, it is possible to "skip" on W0, thus sending W1, W2 and W3 only. This has an immediate data-reduction effect. However, the replication had better be very careful at not providing a destination recovery image that contains for example W1, W2 and not W3. In other words, skipping on W0 means that the "consistency timeline" t of a recovered destination image must not be in the range [t0<t<t3] as this results in an inconsistent image.

The industry uses the term Write-Folding to describe techniques that allow the replication to avoid sending a write if a later write at the same address was sent. Asynchronous replication products often delay the replication of data-to-be-replicated as this may result in increased write-folding. Of course, such replication products need to be able to detect the duplicated writes to achieve that benefit. There are configurations where data is intentionally queued on the source site for hours. There is a clear tradeoff between write-folding data reduction and RPO, and in many cases this tradeoff is controlled by the user, to some degree.

Note that write-folding and dedupe are not the same. Dedupe is all about having two (or more) blocks of different addresses that contain the same content. Write-folding is about having two (or more) writes to the same address, possibly with different contents.

CAS Storage Servers

A CAS Storage Server (CSS) is a fixed-block storage server (storage server is defined hereinabove) that has some additional attributes, as described in the following paragraphs:

[Data Block Content]→[Key] Function

The CSS uses a [data block content]→[key] function that guarantees the following: Let DBC1 and DBC2 be two data block contents and K1 and K2 are the result of the function for these blocks respectively. If DBC1≠DBC2 then with sufficient high probability K1≠K2. "Sufficient high probability" means that it can be practically trusted that the storage server will not store two data blocks with different contents that have the same key. The function can be based on a cryptographic hash function (e.g., Sha-1, Sha-3, etc.).

Let's denote this function as the CSS Hash Function.

[Key]→Physical Location(s)

Internally, a CSS stores data blocks. For each stored data block DB, with corresponding key K, CSS can locate/read the content of DB, given its key K. In other words, CSS maintains some sort of a [key]→[physical address of a data block] mapping for all the stored data blocks.

Note that this description hints that a specific content is physically stored exactly once inside the CSS. However, it is possible (and sometimes even desirable) to store the same content more than once. So, generally, the function maps a given key K to one or more physical storage locations.

Note that there may be implementations where only some of the stored blocks have [key]→[physical] mapping. For example, it is possible that newly written data has not yet passed the phase where its hash function is calculated, and yet is already considered to be stored by the CSS. Generally, such implementations are reasonable modifications known to people with relevant skills and provide embodiments which are applicable for such a CSS implementation.

[Storage Space Block Address]→[Key]

For each exposed storage space block, CSS maintains a map [storage space block address]→[key] (abbreviated as [address]→[key]). Obviously, it is possible that multiple addresses may point to the same key.

Note that there may be implementations where only some of the addresses has [address]→[key] mapping. For example, it is possible that newly written data has not yet passed the phase where its hash function is calculated, and yet it is already considered stored by the CSS. As before, such implementations may be considered as reasonable modifications for people with relevant skills to provide embodiments which are applicable for such CSS implementation.

Referencing a Data Block, Reference Count

Suppose two addresses A1 and A2 refer to the same data block that has the key K. While the data block is stored once on physical storage, it has two references. So, if the application re-writes address A1 with a data block of a different key, then the data-block K must remain stored as it still has one reference left (referenced by A2). If then the application re-writes A2 with a data block of a different key, the data-block K becomes unreferenced. Then, CSS may erase data-block K as no one needs it. It is more than possible that a CSS implementation needs to have a concept of a Reference Count where each stored key has its current reference count. Suppose address A contains the key K1. Generally, a write to address A with data-block K2 results in incrementing the reference count of K2 but also results in decrementing the reference count of K1.

Note that it is possible to create a CSS with an alternative to the above mentioned reference count. Herein we assume the reference count implementation. However, other implementations may be provided by the person skilled in the art.

Special References and Unreferenced Data Blocks

A CSS implementation may need to store data-blocks for its own usage. This "internal usage" means that a data-block may exist without any exposed address referring to that data-block. It is convenient to say that the reference count of such a data-block is not 0. In other words, it is convenient to allow incrementing a reference count without having an address explicitly referring to the data-block.

In addition, there may be cases where a data-block is stored by CSS although its reference count is 0. This means that the data is not essential as no one currently needs it. However, it might still be useful to keep it as possibly, one may need it in the future. So it makes sense to maintain unreferenced data blocks in cases where there is no penalty of maintaining the unreferenced data-block and/or in cases where there is a penalty but it seems attractive to pay the price as there are reasonable chances the block will be re-referenced in the future.

The present embodiments comprise the following:
modifying existing replication mechanisms by piggybacking the concept of transferring the key instead of the data and later on transferring the data only if the key is not stored by the destination CSS;
providing a "data is expected soon" optimization;
providing a source-driven static copy mechanism;
providing a destination-driven static copy mechanism;
providing an asynchronous replication mechanism;
providing a synchronous replication mechanism;
providing a synchronous replication variation involving sending the key;
followed immediately by the data; and
maintaining unreferenced data blocks on DCSS Static Copy The following describes a mechanism that performs a static copy replication between a source CAS storage server (hereafter SCSS) and a destination CAS storage server (hereafter DCSS). The replication is of a known portion of the source storage space (hereafter Source Portion) to a known portion of the destination storage space (hereafter Destination Portion). The SCSS & DCSS are connected by a Replication Network. SCSS and DCSS may communicate with each other using a protocol that is richer than the protocol they expose to client applications.

We assume an entity that instructs the storage servers to start the replication and expects to be able to determine when the static copy replication has ended. The identity of this entity is not very important. Details such as whether that entity communicates with the SCSS or with the DCSS (or both) are also not very important.

We describe here the mechanism as if SCSS is the active or master entity that performs the replication. Later on, we also describe a similar mechanism where DCSS is the active entity.

Instead of copying the actual data, SCSS and DCSS copy only keys of the source portion. If the data represented by a specific key exists in DCSS, then the copy is performed without needing to explicitly transfer the corresponding data. If the key does not exist in DCSS (i.e., the corresponding data), the data needs to be explicitly copied. This may result in a significant data reduction in various real-world scenarios.

The mechanisms described below may have many variations which will be apparent to the person skilled in the art, but which include the above concept.

Source-Driven Static Copy

The Write Key I/O Command (WK Command)

We add a new command to the protocol between SCSS and DCSS—the Write Key I/O Command (hereafter WK Command). The client that initiates the command (in our case SCSS) specifies an address in the server's storage space (i.e., in our case an address of the destination storage space) and a hash key. The client asks to write the data represented by the key to the specified address. If the server has the corresponding data, it successfully acknowledges the WK command, and performs the write operation as if the data was specified. If the server does not have the corresponding data, it rejects the WK command. The following is a more algorithmic flow of handling the WK command by a CSS (for simplicity it is assumed the entire algorithm is atomic):

WK (Storage Space Block Address ADDR, Hash key KEY)
If a [KEY]→[Physical Address] entry does not exist then complete command with "key does not exist"<end>
OLDKEY=address-to-key(ADDR)
address-to-key(ADDR)=KEY
increment reference-count(KEY)
decrement reference count(OLDKEY)
If reference count(OLDKEY) is 0 then possibly delete OLDKEY from the storage
Complete the command with "success"<end>

The Mechanism/Algorithm

For each block of the source portion:
SCSS obtains the hash key of the corresponding source block by accessing the pertinent [address]→[key] entry.
SCSS sends WK command to DCSS, with the source block address and key.
If the command is rejected:
SCSS reads the data of the source block by accessing the [address]→[key]→[physical location] maps.
SCSS sends a write I/O command to DCSS, with the source block address and data
SCSS marks the source block as copied.

Once all the source portion blocks have been handled, the static copy completes.

It is added that

The mechanism described above intentionally does not specify the exact order and/or level of concurrency in which the source blocks are handled. Real-life implementations may obviously choose a relevant strategy that fits the actual implementation and/or is most effective.

Obviously, the protocol is described in an abstractive manner. The actual details may vary according to the actual implementation. For example, multiple WK commands may be aggregated to a single command, etc.

Various optimizations may be applied. For example, if WK commands are sent concurrently, and two (or more) source blocks with the same key are concurrently handled, it is possible that the data is sent twice (or more) since both WK1 and WK2 may concurrently be rejected. Such a case may be specifically optimized. One optimization that also covers this case is described in the next section.

Handling the "Data is Expected Soon" Cases

There may be multiple static copy replications from multiple SCSS to the same DCSS. There may be multiple static copy replications from the same SCSS to the same DCSS. In both cases, it is easy to understand that there may be two (or more) WK commands WK1 & WK2 that were sent to DCSS in parallel and without any coordination between the senders. Under some implementations, this lack of coordination can even happen between two concurrent WK commands that belong to the same static copy operation. This may be the case especially when the SCSS is realized as a set of distributed nodes, such as in many scale-out storage subsystem architectures.

In all these cases, the following scenario (or similar ones) may happen:
(t0) An SCSS sends WK1 with destination address=ADD1 and key=K. DCSS processes WK1, discovers that it does not have key K and hence rejects WK1. The rejection arrives at the originating SCSS.
(t1) An SCSS (same or different than the above SCSS) sends WK2 with destination address=ADD2 and key=K (the same key as the one sent by WK1). DCSS (the same as the above DCSS) processes WK2, discovers that it does not have key K and hence rejects WK2. The rejection arrives at the originating SCSS.
(t2) The SCSS that sends WK1 reads the source block ADD1 and sends its content to DCSS. The data block is sent over the replication network.

(t3) The SCSS that sends WK2 reads the source block ADD2 and sends its content to DCSS. Thus the same data block is sent a second time over the replication network.

As a result, the same data is sent twice. Of course, correctness is not hurt, but the potential for data reduction has been missed.

The same race can happen in asynchronous replication. Arguably, there are use-cases where such a race condition may be frequent with asynchronous replication, for example in applications that frequently write the same data in time proximity to two different addresses, say the basic data together with a log or metadata.

A possible way to solve it is by extending the semantics of the WK command according to the following variation.

When an SCSS sends a WK command, it grants that if the command is rejected then, by a reasonable time, it will send a write command with the data. When rejecting a WK command, DCSS marks that data represented by the specific key is "expected soon". Any further WK commands with the same key will be rejected with a specifically defined completion code saying "I don't have the data yet, but I'm expecting it soon, so please retry the WK command later. If you are not patient enough, you may always send the normal write command instantly".

In real-life, it is hard for an SCSS to absolutely grant that in reasonable time it will send the data to DCSS. There may be unexpected failures such as replication network disconnection, abort of the static copy operation, failure of the SCSS etc. that may not allow the data to be sent. There are various techniques to handle this problem. For example, if DCSS rejected a WK command with key K, it may mark the key K as "expected soon", but set an expiration timeout for that state. So, if, say, 5 seconds passed and the data has not yet arrived, the key is no longer marked as "expected soon". If a second client already sent a WK with the key K and got a "please retry soon" then once it retries it may get a rejection that forces it to send the data (if the timeout passed).

Here is a more algorithmic flow of the improved WK command handling described above:

WK (Storage Space Block Address ADDR, Hash key KEY)
  If a [KEY] [Physical Address] exists
  Then
    If expected-soon(KEY) complete command with "key expected soon"<end>
    Else
      OLDKEY=address-to-key(ADDR)
      address-to-key(ADDR)=KEY
      increment reference-count(KEY)
      decrement reference count(OLDKEY)
      If reference count(OLDKEY) is 0 then possibly delete OLDKEY from the storage
      Complete the command with success
      <end>
  Else
    add entry for KEY in the dictionary
    expected-soon(KEY)=TRUE
    expected-soon-expire-time(KEY)=current-time+TIMEOUT
    complete the command with "key does not exist"
    <end>

In addition, there may be a background process that deletes each existing key entry that has the expected-soon TRUE with an expected-soon-expire-time<current-time.

In addition, a regular write command may reset the expected-soon indication, if set.

Destination-Driven Static Copy

The Read Key I/O Command (RK Command)

We add a new command to the protocol between DCSS and SCSS—the Read Key I/O Command (hereafter RK Command). The client that initiates the command (in our case DCSS) specifies an address in the server's storage space, in our case an address of the source storage space. As a result, the server returns the key that represents the data stored in the specified storage space address.

The Mechanism/Algorithm

For each block of the destination portion:
DCSS sends an RK command to SCSS.
DCSS receives the reply of the RK command—key K.
DCSS checks whether data represented by the key K already exists locally.
If yes, DCSS performs the write to the destination block by modifying the pertinent [address]→[key] entry and by incrementing the reference count of key K.
If no, DCSS sends a read command to SCSS and writes the result to the destination block (as any normal write).

Asynchronous Replication

There exist many different asynchronous replication techniques that are applicable for storage servers and therefore are inherently applicable for CAS storage servers. In all those cases, data is propagated from the source to the destination. Whenever such propagation is about to happen, data-reduction may be achieved if SCSS does not transfer the data, but instead transfers the key, in a manner similar to the WK command previously described. Therefore, if the data already exists in DCSS, data-reduction occurs. So, generally, we suggest a modification that can be applied to all such asynchronous replication techniques. This modification may improve data-reduction, and is applicable for CAS storage servers.

An almost equivalent modification can be made, replacing the source-side WK command with a destination-side RD command.

The following subsections focus on a more concrete asynchronous replication mechanism for CAS storage servers.

Write Interception and Source Replication Nodes (SRNs)

Any replication solution may have a component that intercept writes addressed to the source portion. Such a component is denoted as WIC (Write Interception Component). Depending on the specific storage server architecture, there may be different places to situate WIC. Furthermore, depending on the specific architecture, multiple, distributed WICs may be required to intercept all the writes sent to the source portion.

In the present embodiment, we place another requirement on the placement of WICs: they may be situated in such a way that each WIC is responsible for an exclusive subset of the source portion addresses. In other words, the writes it intercepts are for a specific subset of the source portion addresses, and no other WIC may intercept a write at any of those addresses. This configuration is called Shared-Nothing, and is very feasible, and common for most architectures.

Note that in real-life, responsibility for a subset of source addresses is sometimes moved from one WIC to another, in a well-organized manner, typically but not necessarily as a result of fault handling. Such a move is sometimes called "failover" or "re-balance", and may be included in the present embodiments.

The term Source Replication Node describes a computing unit that embeds a WIC. It is noted that if multiple WIC instances are situated inside the same SRN, we view all those instances as a single unified WIC. SRN is part of SCSS.

It is further noted that the term "storage server" as used herein may include host software carrying replication logic that works with the server but which may be situated in various places in the host such as in the I/O stack.

Single SRN First

Single SRN First is an asynchronous replication mechanism that is limited to situations where exactly a single SRN is needed. Later on, the mechanism is extended to support multiple SRNs, but for now, the assumption is that a single SRN can intercept all the writes at the source portion.

Mechanism for "Normal, Ongoing" Mode

As previously described, an asynchronous replication begins with an initial synchronization phase and then moves to the "normal" mode. Initial synchronization is somewhat complex and often uses elements from the normal mode. Therefore, we begin by describing the normal mode, although this is not the first chronological phase of the replication.

Write Interception, Write Buffer

WIC should be built in a way that it intercepts a write in a moment between the time it was sent by the application and a time the write is acknowledged to the application. For each intercepted write, WIC records the write in the sense of the term "record" as described hereinbelow. WIC is capable of holding the acknowledgement of the write until the recording completes.

WBUF

WIC maintains a data structure called Write Buffer (WBUF). WBUF is generally a persistent, that is non-volatile, structure. There are various ways of ensuring WBUF is persistent, and the present embodiments are agnostic to that aspect. For example, WBUF can be written to disk, stored in NV-RAM, stored in disk with NV-RAM journaling, etc.

For now, we talk only about how data gets into WBUF. We therefore assume that WBUF is a structure that continually grows. In fact WBUF shrinks or gets deleted as a result of replication to the destination, as discussed in greater detail hereinbelow.

WBUF is a container that holds information about intercepted writes. It does not contain the data of the writes, though. The information for each write may contain various fields, but particularly the following information may be included:
1. The source address of the write; and
2. The keys of the write blocks.

Referencing Data by WBUF Entries

While WBUF entries do not hold the write data itself, as long as an entry exists in a WBUF, the data blocks represented by the entry keys may be kept in SCSS. For example, suppose at time t0 the application writes "AAAA" at block 800, and the key is "A". A WBUF entry with K="A" is recorded. The "AAAA" data block was written to SCSS so it is obviously stored. At time t1 the application writes "BBBB" at block 800—which is recorded in WBUF as well. SCSS writes "BBBB" at block 800. If we don't do anything, it is quite possible that the "AAAA" data block will be erased from SCSS. However, as long as the "A" entry resides in a WBUF, the "AAAA" is not erased. One way of implementing this is by increment-reference-count of the data block "AAAA" in the SCSS' CAS dictionary whenever an entry is recorded in a WBUF, and then decrement-reference-count later when the WBUF is erased or when the entry is erased from the WBUF.

This implementation assumes a reference-count mechanism for the SCSS'CAS. However, other implementations may be apparent to the skilled person.

Order of Writes

Generally, the order among the writes recorded in a WBUF is not important—i.e., the time-order need not be stored in WBUF. However, there is one exception: if there are two or more writes stored in the same WBUF, with overlapping addresses, the time-order between the two writes must be recorded.

Breaking Writes into Blocks

As previously defined, a write can be issued at an extent (range of addresses). For simplicity of the discussion (and sometimes also for simplicity of the implementation), note that the WBUF may be organized as a set of entries where each entry describes only a single block. So, if a write to a range of, say, 4 blocks, is intercepted, it can be recorded as 4 independent entries, each entry describing a single block. The use of independent entries is assumed hereinbelow for clarity.

The "order of write" requirement described above can now be formulated somewhat more simply: the time-order between recorded WBUF blocks need not be stored, except for blocks of the same address, where their time-order must be stored.

WBUF Write Folding

If two blocks for the same address are recorded in WBUF, it is desirable that only the later-in-time instance is kept in WBUF, thus providing write-folding. However, failure to perform write-folding does not hurt correctness as long as the time-order between the same-address-blocks is recorded.

Realizing WBUF

WBUF is defined in a relatively generic way. Various concrete data-structures and/or mechanisms can be used to realize WBUF. Here are several examples:

Persistent Queue/Log: WBUF is realized as a persistent log/queue. Every new entry is appended to the queue. The queue is a very simple data representation with the potential of providing a very fast mechanism. Here is a brief discussion re some of the challenges involved:

Space overflow: The structure is not limited in size and hence may overflow. Typically, this is not an issue unless WBUF covers a quite lengthy period. Maintaining a big lengthy WBUF is certainly a relevant use-case, so this issue cannot be dismissed that easily, though. There is further a requirement to maintain the data blocks referenced by the WBUF, and this is more problematic space-wise than the space overflow of the WBUF itself. After all, the WBUF entry is significantly smaller than the data it represents. Therefore, WBUF overflows and user-data overflows are considered together. It is noted that this issue is common to various WBUF embodiments and is not specific to the queue implementation. Interestingly, without CAS storage or inline dedupe, the problem is more evident: Without CAS storage, the data of an intercepted write is written to both the source storage and to a log/journal. As long as the write is recorded in the WBUF, its data is actually duplicated, to provide one copy in the source portion and one in the log. With CAS storage that supports inline-dedupe, however, the problem is mitigated, to some degree: Once a write is intercepted and enters the WBUF, its data does not consume extra storage as the CAS dedupes the data that otherwise would have been duplicated. Having said all that, however, space overflow is an issue that requires handling. This issue is discussed hereinbelow.

Write-folding: While internal write-folding is difficult, it is possible. Note that write-folding can be performed at various points in time—e.g.,
(1) during recording;
(2) just before (or even during) submission of WBUF to the destination;
(3) any time in-between the two; and
(4) any combinations of the above.

Snapshot: If the SCSS supports snapshots, such a technology can be used for the realization of the WBUF plus the realization of the requirement to maintain the data referenced by WBUF entries as long as those entries exist. A WBUF initiation is realized by taking a snapshot at the source portion. Since internally, snapshot technologies maintain metadata that describes the changed block since the time of the snapshot, this metadata can be viewed as the WBUF itself. The user data maintained by the snapshot is the mechanism that grants that data referenced by WBUF still exists in the machine even if it was re-written since then. Space overflow is of course an issue here as well. Many replication products use snapshots in a similar manner.

WBUF Toggling

What is WBUF Toggling

From the moment WBUF1 is initiated, it records entries. The writes captured by WBUF1 are not yet replicated to DCSS. At a specific moment, the SRN decides to perform a WBUF Toggling. WBUF toggling is the act of completing the recording to WBUF1, and starting to record to a new WBUF, WBUF2.

Once toggling completes, the writes represented by WBUF1 can now be replicated to DCSS. WBUF toggling creates a consistency timeline, meaning that if all WBUF1 entries are applied at the destination storage portion, the destination image is crash consistent.

In multi-SRN constellations, WBUF toggling plays a critical consistency synchronization role among the SRNs. This is discussed hereinbelow. The next paragraphs suggest how WBUF toggling can take place in single-SRN replication.

WBUF Toggling Mechanism/Algorithm

A goal is to guarantee that a completed WBUF can be applied on the destination storage in such a way as to create a crash-consistent image. To achieve that, one provides that if write W2 depends on write W1, then write W2 must not reside in an earlier WBUF than the WBUF to which W1 is recorded. Since a write is not acknowledged before it is recorded to the currently active WBUF, this requirement is inherently satisfied. Therefore, in a single SRN constellation, WBUF toggling is pretty straight forward—once a decision is taken to perform WBUF toggling, any new writes should be recorded to the new WBUF. Note that if multiple writes are processed concurrently by the SRN during the toggling, any arbitrary subset of those writes can be recorded to the old WBUF, and the rest can be recorded to the new WBUF, as all those writes are inherently not dependant on each other. However, once a write W1 is recorded to the new WBUF, any writes received following W1 acknowledgment to the application, must be recorded to the new WBUF.

WBUF Toggling Policy

A number of strategies are available for WBUF toggling. One strategy is periodic toggling. The system and/or the user decide on a time period (e.g., 1 second, 10 minutes, etc.) and toggling takes place approximately at the chosen interval. Note that the selected cycle period becomes a minimum for the effective RPO of the replication. In other words, if toggling takes place every, say, 10 minutes, RPO will in practice not be smaller than 10 minutes. As previously mentioned, longer periods have larger write-folding potential.

Replicating a "Completed" WBUF

Viewing WBUFs as a Series

Once a WBUF has been toggled, it contains a fixed quantity of entries—no further entries can be added. The associated writes may now be replicated to DCSS. One may view the WBUFs of a replication relation as a series (e.g., WBUF(1), WBUF(2), ... where WBUF(N-1) is earlier than WBUF(N)).

Once WBUF(N) has been toggled, it is possible that the previous WBUF(N-1) replication has not yet ended. It is up to the implementation to decide whether the replication of WBUF(N) should start before WBUF(N-1) replication has been completed. For simplicity we assume such a serialization takes place, but the skilled person will be aware of the possibility of adopting other strategies.

Write-Folding a WBUF prior to its Replication

Depending on the WBUF implementation and depending on the write-folding support, some write-folding can take place before SRN replicates the WBUF's writes. For some write-folding algorithms, this may even take place during the replication.

Merging Consecutive WBUFs to Gain even more Write-Folding

If WBUF(N) was toggled but cannot now be replicated because, say, WBUF(N-2) replication is still in progress, it is possible to merge two WBUFs (e.g., WBUF(N) and WBUF(N-1)) into a single, bigger, WBUF. Such a merge may provide an extended write-folding. The downside is worse RPO, as the time of toggling between WBUF(N-1) and WBUF(N) can no longer act as a consistency timeline. Note that under some circumstances, one may even join a WBUF with its predecessor even if its predecessor is currently already replicating to DCSS.

Replicating the WBUF

SRN and DCSS maintain a replication protocol via the replication network. The protocol may allow SRN to replicate WBUFs to DCSS. DCSS understands which WBUF it receives, its position in the series, etc. Of course, it is not only the actual WBUF that is being replicated, but a combination of the metadata stored in the WBUF and some data blocks represented by the WBUF entries—if they do not already exist in DCSS.

In many ways, the WBUF replication is similar to the mechanism described in the source-driven static copy, with some modifications. Generally, for each entry in WBUF, SRN sends a corresponding WK command, for which both address and key are stored in the WBUF, and sends the data of the source block only if this data cannot be found in DCSS. The "data is expected soon" optimization discussed hereinabove is applicable here as well.

One critical difference is that DCSS may not apply the data immediately on the destination portion. In such a case, any source-side disaster happening during the WBUF replication may result in an inconsistent image on the destination side. Therefore, DCSS stores the received information somewhere else, e.g., in some sort of a side-log. The data blocks replicated, or virtually replicated as they already exist, may be considered by DCSS as entries that must be preserved, for example by incrementing their reference count, etc.

Once WBUF(N) completely arrives and if all the previous WBUFs (e.g., WBUF(N-1)) have already arrived and applied to the destination portion, it is possible to apply WBUF(N)'s data on the destination portion. This applying process is not atomic in time, and source-side disasters can happen during that process. However, since the entire WBUF(N) information is persistently stored in DCSS, it may be guaranteed to bring the destination portion to contain a crash consistent image.

Non Write-Folded WBUFs

If WBUF is not completely write-folded—i.e., if there are two (or more) entries to the same address within the same WBUF, then those entries may be applied according to their time-order, otherwise consistency will not be maintained. There are various ways to enforce this constraint of which the skilled person will be aware. One possible implementation may be that the WBUF is maintained according to the writes' time-order, replicated as such, stored as such by DCSS, and applied as such on the destination portion.

Replicating a Not-Yet-Toggled WBUF

It is possible to start replicating a WBUF even before it has been completed (toggled). Some write-folding potential is lost, and yet, under some circumstances, for example if the replication network is currently not busy, it may make sense to utilize it.

Mechanism for Initial Synchronization

Initial synchronization is a phase in which data reduction may be extremely critical. In many cases, initial synchronization requires replication of more data than in the normal, ongoing mode. The lack of sufficient network bandwidth may slow initial synchronization down or even make it non-feasible, despite the replication network being adequate for the normal, ongoing replication.

There is a large number of algorithms and variations of those algorithms used by existing replication products. What is common to all such algorithm is the need to copy the original source portion data, as well as handle source-portion writes that arrive during the copy process. In many cases there are various optimizations where not all incoming writes are actually replicated, as their content may be replicated later by the initial copy process.

In the present embodiments are included a modification to the existing initial synchronization mechanisms. This modification is to send the actual data only if it does not already exist in DCSS, otherwise replication is of the key only.

An implementation is as follows. There is a background task that copies all the source portion data to the destination portion—as with the static copy above. In addition, all incoming writes are queued in one big WBUF(1). Once the background copy task completes, WBUF(1) is toggled and its replication begins. From that moment, the normal, ongoing mode behavior holds. Only after WBUF(1) replication to DCSS completes can a consistent destination image be provided upon request.

Space Overflow Handling

We now discuss handling of the space-overflow case. Generally, virtually any asynchronous replication queues the writes one way or another, and such a queue may overflow. In the present case, the queue is the WBUF and the data blocks that otherwise would not have been required to stay at the SCSS storage. Some existing replication products deal with such an overflow rather simply—they abort the replication, and replication must be reestablished from scratch. This is an acceptable approach in cases where it is clear that the case is very rare.

Another popular approach is for SRN to maintain a bitmap of dirty blocks so when/if the queue overflows, it can move to a re-synchronization state. Re-synchronization is very similar to initial synchronization, except that the data to be re-synchronized is not the entire source portion (as in full initial synchronization) but only the areas marked as dirty in the bitmap. Replication products that maintain this bitmap during the normal, ongoing mode may use methods of resetting some of those bits when the corresponding writes have been replicated to the destination. If they do not then, as otherwise, later queue overflow may result in a lot of unnecessary resynchronization. Sometimes, to save resources, each bit in the bitmap covers a storage extent bigger, or much bigger, than a block. Interestingly, it is easier to know when such a bit should be set than to know when such a bit can be reset as by the time one wants to reset a bit other writes to the same area may be in progress.

Another highly critical issue is the ability to perform disaster recovery for a disaster that happens during re-synchronization. This is not trivial as, typically, the nature of a (re)synchronization algorithm is such that crash-consistency is not maintained at the destination. In some cases, the destination portion is snapshot before re-synchronization begins so if a disaster happens, the snapshot is used. In some other cases, a more internal, inherent-to-the-replication-product, technique is used.

Exemplary Concrete Space Overflow Handling

In an exemplary embodiment, no bitmap is maintained during normal, ongoing mode. On space overflow, we throw away the WBUF and move to re-synchronization. During re-synchronization, DCSS does not store the received data directly on the destination portion. Only once all re-synchronization completes, can DCSS start applying the data on the destination portion. Note that those schemes, when used with non CAS storage, requires a lot of true data movement from one disk to another. With CAS storage, copying the data from the side-log to the real destination portion does not cost data-block I/Os as copy within a CAS domain results in CAS MD manipulation only.

The above approach, does not use bitmaps at any time during the full synchronization, but instead relies on the fact that data that already exists will not be replicated to the destination, and will not even be read from the source portion as its hash key is already available. However, exchanging keys of all the source portion blocks via the replication network, each time re-synchronization happens, may still be problematic in many practical cases. Therefore, such an approach may be improved as follows: whenever space overflows, the SRN may scan all the existing WBUFs, including the one currently being used for write-recording, and may transfer them to a bitmap. Then the WBUFs can be purged and a re-synchronization based on the built bitmap may begin.

Multi-SRN Replication

The discussion above assumes a single SRN replication. In other words, it was assumed that the architecture and the need allows to provide a single write interception component (WIC) located in a single computing unit (node) where that WIC is capable of intercepting all the writes addressed at the source portion. However, there are many cases where this assumption is incorrect. The following discusses how the mechanisms detailed above may be modified or extended to support multi-SRN constellations. The shared-nothing assumption still holds.

Initial Synchronization

Each of the SRNs has its own subset of the source portion. Initial synchronization can be performed such that each SRN copies its source portion subset. Moving to normal, ongoing mode must be orchestrated by an entity (e.g., by DCSS), and can take place only after all SRNs have completed their part of the synchronization task.

Normal, Ongoing Mode

We define WBUF(i,j) to be the WBUF(j) or SRN(i). One of the critical differences between single SRN and multi SRN replications is the need to coordinate the WBUF toggling among all SRNs. As discussed before, it is critical that if write W2 depends on write W1, then write W2 must not reside in an earlier WBUF than the WBUF to which W1 is recorded. In a Multi-SRN environment, the earlier relationship holds also between WBUFs from different SRNs. So in our example, if W1 is stored in WBUF(5,800) and W2 is stored in WBUF(3, 799), consistency will be hurt.

There are various ways to perform coordinated toggling among distributed WBUFs. Generally, any variation on a distributed barrier may do the trick. Here is an example of a concrete implementation:

One entity is considered as the master. This entity originates the distributed toggling operation. This entity may or may not reside in an SRN, and yet it should be able to communicate with the SRNs, and to achieve practical performance, it should be able to communicate with SRNs with a not-too-high latency.

The master sends a "start barrier" command to all SRNs concurrently. Once an SRN receives such a command, it starts to hold the acknowledgments of all the currently active writes at the source portion. Other handling, such as processing the write, recording it to WBUF etc. need not be delayed. Furthermore, a new WBUF is created, and any new write will be recorded to a new WBUF. Those new write acknowledgments are also held. Once the SRN changed its behavior, it may complete the "start barrier" command, and continue to behave as instructed.

Once the master receives completion of the "start barrier" command from all the SRNs, it sends an "end barrier" command to all the SRNs. Once an SRN receives the "end barrier" command, it no longer needs to hold acknowledgment for writes. The distributed toggling is thus completed.

On the DCSS side, DCSS receives in their entirety all the WBUFs of a specific generation (e.g., WBUF(1,800), WBUF (2,800) . . . ) before it can safely apply them on the destination portion. Except for that, the behavior is the same as in single-SRN replication.

Space Overflow and Resynchronization

It is generally not necessary to set all SRNs to a re-synchronization state due to a single SRN whose space has overflowed. There are quite a few ways to handle resynchronization and state-changes in multi-SRN replication which will be apparent to the person skilled in the art.

Synchronous Replication

Synchronous replication implementations need to realize initial synchronization and also re-synchronization, as with asynchronous replication. So the pertinent mechanisms described in respect of asynchronous replication are applicable for synchronous replication as well, and are not explicitly repeated again.

Regarding the normal, ongoing mode, the concept of sending the key first, as used in static copy and asynchronous replication, is fully applicable. However, in many situations it can increase the latency so its practical attractiveness might be smaller.

Another alternative is the following write-handling flow: SCSS sends the key, followed immediately, without waiting for acknowledgement, by the data-block itself. DCSS can acknowledge the write faster if it finds the Key to exist in its store, otherwise it reverts to standard write. This saves time for the DCSS to receive the block and calculate the Key, and can reduce the response time for writes whose keys are already stored in DCSS. In addition, the existing data transfer may be aborted.

Maintaining Unreferenced Data Blocks on DCSS

Following is an improvement in the CAS storage server mechanism that, if applied on DCSS, may result in data transfer reduction.

Hereinabove the concept was mentioned of maintaining an unreferenced data block in a CSS. In various replication scenarios, a data block K may exist in DCSS, then become unreferenced, as the pertinent storage space address is re-written, etc., and then be re-written. This re-write involves re-transfer of the data block over the replication network. In the present embodiment, the data-blocks on DCSS that become unreferenced remain stored for as long as possible. Therefore, if re-write of a deleted, that is unreferenced, block content happens, the data block itself will not need to be re-replicated over the replication network.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A CAS data storage system comprising:
at least one source CAS data storage space
at least one destination CAS data storage space, and
a communication line connecting said source storage space and said destination storage space, and wherein input data for storage in said system arrives at said source storage space for storage at said source storage space and to be replicated to said destination storage space, the source storage space further comprising an active buffer of incoming data for replication to said destination storage space, said active buffer configured to hold for each of a plurality of data items of said incoming data, a hash result of the respective data item and an address, the system being configured to detect whenever there is more than one data item in said active buffer sharing a same address and upon such detection to transfer a respective hash result of only a last of said data items sharing said same address, to said destination storage space;
wherein data items at said destination storage space are stored as data content alongside hash keys identifying said data content, wherein upon deletion request said data items being deleted by de-referencing said data items said system being configured to reuse said de-referenced data items by comparing deleted hash keys to hash keys of incoming data items;
wherein upon receipt of an incoming hash key that corresponds to a first hash key of the deleted hash keys, wherein the first hash key is associated with a first de-referenced data item, the system is enabled to associate the incoming hash key with the first de-referenced data item converting the first de-referenced data item to a referenced data item;
wherein the CAS data storage system is enabled to send a Read I/O request from said source storage space to said destination storage space, wherein the read I/O request relates to an address on said destination storage space, wherein said destination storage space responds by sending a hash key associated with the address on said destination storage space to enable said source storage space to determine whether data associated with the address is already present on said source storage space;
wherein the CAS data storage system is enabled to determine whether a requested data block is expected and pending, wherein the CAS data storage system is enabled to postpone a Write I/O based on the determination.

2. The system of claim 1, wherein said source storage space is configured to transfer said active buffer when said active buffer is full, and said destination storage space is configured to test hash results contained in said transferred active buffer to determine whether any or all of said hash results are already present at said destination, corresponding data being requested from said source storage space only in the case of a hash result not already present at said destination storage space.

3. The system of claim 2, said destination storage space being configured to send a signal indicating whether said transfer of said corresponding data is needed, said destination storage space being further configured such that upon receipt of a hash key identical to an earlier hash key for which data transfer was required but for which said data transfer is currently incomplete, a modified acknowledge signal is issued indicating that data is awaited.

4. The system of claim 3, wherein a time-out is set following said earlier hash key, such that said modified signal indicating that said data is awaited is only sent prior to expiry of said timeout.

5. The system of claim 1, wherein said source storage space comprises a plurality of nodes each with a separate active buffer, the system being configured to full respective active buffers simultaneously at all of said plurality of nodes and to toggle to new respective active buffers.

6. The system of claim 5, wherein said source storage space is configured to select one of said nodes as a master node to monitor said respective active buffers and to carry out said simultaneous completion and toggling.

7. A CAS data storage system comprising at least one source CAS data storage space and a destination CAS data storage space, and a communication line connecting said source storage space and said destination storage space, and wherein input data for storage in said system arrives at said source storage space for storage in said source storage space and replication in said destination storage space, and wherein a hash key of a data item is transferred to said destination storage space, the hash key enabling the destination storage space to determine whether said data corresponding to the data item is already present at said destination storage device and does not require data transfer, said destination storage space being configured to send a signal indicating whether data transfer is required;
wherein data item at said destination storage space are stored as data content alongside hash keys identifying said data content, wherein upon deletion request said data items being deleted by de-referencing said data items, said system being configured to reuse said de-referenced data item by comparing deleted hash keys to hash keys of incoming data items;
wherein upon receipt of an incoming hash key that corresponds to a first hash key of the deleted hash keys, wherein the first hash key is associated with a first de-referenced data item, the system is enabled to associate the incoming hash key with the first de-referenced data item converting the first de-referenced data item to a referenced data item;
wherein the CAS data storage system is enabled to send a Read I/O request from said source storage space to said destination storage space, wherein the read I/O request relates to an address on said destination storage space, wherein said destination storage space responds by sending a hash key associated with the address on said destination storage space to enable said source storage space to determine whether data associated with the address is already present on said source storage space;
wherein the CAS data storage system is enabled to determine whether a requested data block is expected and pending, wherein the CAS data storage system is enabled to postpone a Write I/O based on the determination.

8. The system of claim 7, said destination storage space being further configured such that upon receipt of a hash key identical to an earlier hash key for which data transfer was required but for which said data transfer is currently incomplete a modified acknowledge signal is issued indicating that data is awaited.

9. The system of claim 7, further configured to carry out initial synchronization by sending hash keys of successively stored data items of said source storage space.

10. The system of claim 7, wherein a time-out is set following said hash key, such that said signal indicating receipt of an identical hash key is only sent prior to expiry of said timeout.

11. A system comprising two CAS data storage spaces with synchronous replication therebetween, one of said storage spaces being a source CAS data storage space and another of said storage spaces being a destination CAS data storage space, the system further comprising a communication line connecting said source storage space and said destination storage space and having a latency, communication over said communication line comprising sending data and acknowledgements in a synchronous cycle, wherein input data for storage in said system arrives at said source storage space for storage in said source storage space and replication to said destination storage space, and wherein a hash key of a data item is transferred to said destination storage space followed within said cycle by starting to transfer corresponding data without awaiting a corresponding acknowledgement, the hash key enabling the destination storage space to determine whether said corresponding data is already present at said destination storage device and does not require data transfer, and to send an acknowledgement in said respective synchronous cycle indicating whether said data transfer is required, said acknowledgement usable at said source storage space to carry out one member of the group comprising discontinuing said started transfer of said corresponding data and acknowledging to a sending application;
wherein data item at said destination storage space are stored as data content alongside hash keys identifying said data content, wherein upon deletion request said data items being deleted by de-referencing said data items, said system being configured to reuse said de-referenced data items by comparing deleted hash keys to hash keys of incoming data items;
wherein upon receipt of an incoming hash key that corresponds to a first hash key of the deleted hash keys, wherein the first hash key is associated with a first de-referenced data item, the system is enabled to associate the incoming hash key with the first de-referenced data item converting the first de-referenced data item to a referenced data item;
wherein the CAS data storage system is enabled to send a Read I/O request from said source storage space to said destination storage space, wherein the read I/O request relates to an address on said destination storage space, wherein said destination storage space responds by sending a hash key associated with the address on said destination storage space to enable said source storage space to determine whether data associated with the address is already present on said source storage space;

wherein the destination CAS data storage space is enabled to determine whether a requested data block is expected and pending, wherein the destination CAS data storage system is enabled to postpone a Write I/O based on the determination.

12. A CAS data storage method wherein input data arrives at a source CAS data storage space for storage at said source storage space and replication to a destination CAS data storage space over a communication line, the method comprising filling an active buffer, at said source storage space, with incoming data for transfer to said destination storage space, said active buffer holding for each of a plurality of data items of said incoming data, a hash result of the respective data item and a storage address, the method further comprising detecting whenever there is more than one data item in said active buffer sharing a same storage address and upon such detection transferring to said replication storage space a respective hash result of only a last of said data items sharing said same storage address;

wherein data items at said destination storage space are stored as data content alongside hash keys identifying said data content, wherein upon deletion request said data items being deleted by de-referencing said data items, the method comprising reusing said de-referenced data items by comparing deleted hash keys to hash keys of incoming data items;

wherein upon receipt of an incoming hash key that corresponds to a first hash key of the deleted hash keys, wherein the first hash key is associated with a first de-referenced data item, the system is enabled to associate the incoming hash key with the first de-referenced data item converting the first de-referenced data item to a referenced data item;

wherein the CAS data storage system is enabled to send a Read I/O request from said source storage space to said destination storage space, wherein the read I/O request relates to an address on said destination storage space, wherein said destination storage space responds by sending a hash key associated with the address on said destination storage space to enable said source storage space to determine whether data associated with the address is already present on said source storage space;

wherein the CAS data storage system is enabled to determine whether a requested data block is expected and pending, wherein the CAS data storage system is enabled to postpone a Write I/O based on the determination.

13. The method of claim 12, further comprising:
transferring said active buffer from said source storage space to said destination storage space when said active buffer is full,
at said destination storage space testing hash results contained in said transferred active buffer to determine whether any or all of said hash results are already present at said destination, and
requesting corresponding data from said source storage space only in the case of a hash result not already present at said destination storage space.

14. The method of claim 13, further comprising:
sending a signal from said destination storage space, indicating whether transfer of said corresponding data is required, and
upon receipt of a hash key identical to an earlier hash key for which data transfer was requested but for which said data transfer is currently incomplete a modified acknowledge signal is issued indicating that the corresponding data is awaited and should not be sent.

15. The method of claim 14, wherein a time-out is set following said earlier hash key, such that said modified signal indicating that the data is awaited is only sent prior to expiry of said timeout.

16. The method of claim 12, wherein said source storage space comprises a plurality of nodes each with a separate active buffer, the method further comprising:
completing respective active buffers simultaneously at all of said plurality of nodes; and
toggling at each of said plurality of nodes to new respective active buffers.

17. A CAS data storage method for at least one source CAS data storage space and a destination CAS data storage space, and a communication line connecting said source storage space and said destination storage space, and wherein input data for storage in said system arrives at said source storage space for storage in said destination storage space, the method comprising:
transferring a hash key of a data item to said destination storage space, the hash key enabling the destination storage space to determine whether data corresponding to the data item is already present at said destination storage device and thus does not require data transfer;
wherein the destination storage is enabled to compare the hash key with stored hash keys corresponding to de-referenced data items on said destination storage, said destination storage being configured to reuse said de-referenced data,
wherein when the hash key corresponds to a first hash key of the stored hash keys, the destination storage is enabled to associate the hash key with the first hash key thereby converting the first de-referenced data item to a referenced data item; and
sending a signal indicating whether said destination storage space requires data transfer;
wherein the CAS data storage system is enabled to send a Read I/O request from said source storage space to said destination storage space, wherein the read I/O request relates to an address on said destination storage space, wherein said destination storage space responds by sending a hash key associated with the address on said destination storage space to enable said source storage space to determine whether data associated with the address is already present on said source storage space;
wherein said destination storage space is enabled to determine whether a requested data block is expected and pending, wherein the said destination storage space is enabled to postpone a Write I/O based on the determination.

18. The method of claim 17, further comprising,
upon receipt of a hash key identical to an earlier hash key for which data transfer was required but for which said data transfer is currently incomplete sending a modified acknowledge signal indicating that data is awaited.

19. The method of claim 18, comprising setting a time out following receipt of said earlier hash key, such that sending said modified signal indicating that data is awaited is only sent prior to expiry of said time out.

20. A synchronized CAS data storage method for at least one source CAS data storage space and a destination CAS data storage space, and a communication line connecting said source storage space and said destination storage space and having a latency, communication over said communication line comprising sending data and acknowledgements in synchronous cycles, the method comprising:
  receiving input data at said source storage space for storage in said destination storage space; transferring a hash key of a data item of said input data to said destination storage space in one of said synchronous cycles;
  within said one synchronous cycle starting to transfer corresponding data without awaiting a corresponding acknowledgement, the hash key enabling the destination storage space to determine whether it already has said corresponding data and does not require data transfer;
  wherein the destination storage is enabled to compare the hash key with stored hash keys corresponding to de-referenced data items on said destination storage, said destination storage being configured to reuse said de-referenced data;
  wherein when the hash key corresponds to a first hash key of the stored hash keys, the destination storage is enabled to associate the hash key with the first hash key thereby converting the first de-referenced data item to a referenced data item;
  sending an acknowledgement in said respective synchronous cycle indicating whether said data transfer is required, and
  one member of the group consisting of: discontinuing said started transfer of said corresponding data if said data transfer is not required, and sending an external acknowledgement to a source application;
  wherein the synchronized CAS data storage is enabled to send a Read I/O request from said source storage space to said destination storage space, wherein the read I/O request relates to an address on said destination storage space, wherein said destination storage space responds by sending a hash key associated with the address on said destination storage space to enable said source storage space to determine whether data associated with the address is already present on said source storage space;
  wherein said destination storage space is enabled to determine whether a requested data block is expected and pending, wherein the said destination storage space is enabled to postpone a Write I/O based on the determination.

21. A system comprising: a first CAS storage space configured to generate and use CAS metadata for storing data items internally therein, and a second CAS storage space configured to generate and use CAS metadata for storing data items internally therein, the first CAS storage space being connected via a communication line to said second CAS storage space and configured to communicate metadata of said first CAS storage space to said second CAS storage space over said communication link in a replication procedure to replicate said first CAS storage space at said second CAS storage space, said CAS metadata comprising a hash key of a data item, the hash key corresponding to a data item to be transferred and enabling the destination storage space to determine whether data corresponding to the data item is already present at said destination storage device and thereby not requiring data transfer, said destination storage space being configured to send a signal indicating whether data transfer is required for said replication;
  wherein data items at said destination storage space are stored as data content alongside hash keys identifying said data content, wherein upon deletion request said data items being deleted by de-referencing said data items, the method comprising reusing said de-referenced data items by comparing deleted hash keys to hash keys of incoming data items;
  wherein upon receipt of an incoming hash key that corresponds to a first hash key of the deleted hash keys, wherein the first hash key is associated with a first de-referenced data item, the system is enabled to associate the incoming hash key with the first de-referenced data item converting the first de-referenced data item to a referenced data item;
  wherein the system is enabled to send a Read I/O request from the first CAS storage to the second CAS storage, wherein the read I/O request relates to an address on the second CAS storage, wherein the second CAS storage responds by sending a hash key associated with the address on the second CAS storage to enable the first CAS storage to determine whether data associated with the address is already present on the first CAS storage;
  wherein the system is enabled to determine whether a requested data block is expected and pending, wherein the system is enabled to postpone a Write I/O based on the determination.

22. A computer-executable method for managing a CAS system, the CAS system including a source CAS data storage space and a destination CAS data storage space, the computer-executable method comprising:
  receiving a first hash key at the destination CAS data storage space, wherein the hash key is associated with a data item;
  determining whether the first hash key corresponds to a second hash key from a list of hash keys on the destination CAS data storage space, wherein the list of hash keys includes hash keys of un-referenced data items stored on the destination CAS data storage space, wherein the second hash key is associated with a second data item; and
  upon a positive determination, associating the first hash key with the second data item;
  wherein the CAS system is enabled to send a Read I/O request from the source CAS data storage space to the destination CAS data storage space, wherein the read I/O request relates to an address on the destination CAS data storage space, wherein the destination CAS data storage space responds by sending a hash key associated with the address on the destination CAS data storage space to enable the source CAS data storage space to determine whether data associated with the address is already present on the source CAS data storage space;
  wherein the CAS system is enabled to determine whether a requested data block is expected and pending, wherein the CAS system is enabled to postpone a Write I/O based on the determination.

* * * * *